United States Patent
Chavez, Jr.

(10) Patent No.: US 6,192,234 B1
(45) Date of Patent: Feb. 20, 2001

(54) AUTOMATIC CALL COVERAGE ADMINISTRATION BY WIRELESS TERMINALS

(75) Inventor: David L. Chavez, Jr., Thornton, CO (US)

(73) Assignee: Avaya Technology Corp., Miami Lakes, FL (US)

(*) Notice: Under 35 U.S.C. 154(b), the term of this patent shall be extended for 0 days.

(21) Appl. No.: 09/182,336

(22) Filed: Oct. 29, 1998

(51) Int. Cl.[7] ............................................ H04Q 7/20
(52) U.S. Cl. .................. 455/414; 455/445; 455/456; 455/458; 455/461; 455/519
(58) Field of Search .................................. 455/414, 417, 455/422, 435, 445, 456, 458, 459, 461, 11.1, 518, 519, 520; 379/211, 214, 201, 210

(56) References Cited

U.S. PATENT DOCUMENTS

| | | | |
|---|---|---|---|
| 5,243,645 | * | 9/1993 | Bissell et al. ........................ 455/414 |
| 5,260,986 | * | 11/1993 | Pershan ................................ 455/413 |
| 5,610,972 | * | 3/1997 | Emery et al. ........................ 455/414 |
| 5,699,407 | * | 12/1997 | Nguyen ................................ 455/414 |
| 5,745,561 | * | 4/1998 | Baker et al. ........................ 379/211 |
| 5,835,860 | * | 11/1998 | Diachina ............................. 455/458 |
| 6,097,963 | * | 8/2000 | Boltz et al. ......................... 455/518 |
| 6,101,396 | * | 8/2000 | Chavez, Jr. ......................... 455/518 |

* cited by examiner

Primary Examiner—Reinhard J. Eisenzopf
Assistant Examiner—Lester G. Kincaid
(74) Attorney, Agent, or Firm—John C. Moran

(57) ABSTRACT

Wireless terminals automatically and dynamically establish call coverage groups based on physical locations. Each location is assigned a call coverage telephone number. When a new wireless terminal enters the location, the wireless terminals automatically and dynamically determine a new call coverage path. The wireless terminals establish the new call coverage path by communicating with each other. The wireless switching system to which the wireless terminals are connected does not administer the call coverage group. The criteria utilized to establish the call coverage group is stored within the wireless terminals that will be part of that call coverage group. When a call is received by the wireless switching system for the call coverage number, the wireless switching system broadcasts a page message for the call coverage number. The wireless terminals in the call coverage group for the call coverage number each wait an individual predefined amount of time before attempting to respond to the page message. The individual predefined amount of time for each wireless terminal in the call coverage group is defined by the wireless terminal's position in the call coverage path. If available, the first wireless terminal in the call coverage path will immediately respond to the setup message for the call coverage number.

30 Claims, 10 Drawing Sheets

| TABLE 1 FOR WIRELESS TERMINAL 102 | | | | | | |
|---|---|---|---|---|---|---|
| AREA | COVERAGE NUMBER | PRIORITY | FIXED UNIT | ASSIGNED TEL. NUMBER | COVERAGE DELAY | VOICE MAIL # |
| 112 | 1900 | 1 | 117 | 4901 | 20 | 4900 |
| 113 | 2900 | 2 | 115 | 4901 |  | 4900 |
| 114 | 3900 | 0 | 116 | 4901 |  | 4900 |

| TABLE 1 FOR WIRELESS TERMINAL 103 | | | | | | |
|---|---|---|---|---|---|---|
| AREA | COVERAGE NUMBER | PRIORITY | FIXED UNIT | ASSIGNED TEL. NUMBER | COVERAGE DELAY | VOICE MAIL # |
| 112 | 1900 | 2 | 117 | 4902 | 10 | 4900 |
| 113 | 2900 | 3 | 115 | 4902 |  | 4900 |
| 114 | 3900 | 1 | 116 | 4902 |  | 4900 |

| TABLE 1 FOR WIRELESS TERMINAL 104 | | | | | | |
|---|---|---|---|---|---|---|
| AREA | COVERAGE NUMBER | PRIORITY | FIXED UNIT | ASSIGNED TEL. NUMBER | COVERAGE DELAY | VOICE MAIL # |
| 112 | 1900 | 3 | 117 | 4903 | 0 | 4900 |
| 113 | 2900 | 2 | 115 | 4903 |  | 4900 |
| 114 | 3900 | 0 | 116 | 4903 |  | 4900 |

AUTOMATIC CALL COVERAGE ADMINISTRATION BY WIRELESS TERMINALS

TECHNICAL FIELD

This invention relates generally to switching systems and, in particular, to call coverage groups.

BACKGROUND OF THE INVENTION

In prior art business telecommunications switching systems, call coverage groups are well known. A call coverage group allows a list of telephones to be stored within the switching system to handle calls for a telephone of a principal. When the switching system receives a call for the principal's telephone and the principal's telephone does not answer, the switching system attempts to connect the calling party with the first telephone in the call coverage telephone group. If the first telephone is unavailable, then the second telephone in the call coverage group is selected. In the prior art, the call coverage groups are administered manually.

The prior art call coverage groups have functioned well with wired telephone sets and wireless telephones where the wireless telephone was a second telephone set for a user. In addition, prior art call coverage groups and their administration have functioned well for the traditional business environments where an employee is assigned a desk or a specific location and performs their principal work function at that telephone or location. For example, the traditional environment is for a principal to have a telephone and for the first telephone in the call coverage path for the principal's telephone to be the principal's secretary. The traditional environment is slowly changing. In the emerging business environment, individuals do not have a wired telephone but rather they have a wireless telephone which they carry with them at all times and which is their only telephone set. In addition, employees during the course of a day perform many functions at different locations. For example, a principal's secretary may vary with the time of day.

An example of an important problem that traditional call coverage groups and their administration can not deal with is a situation that occurs in a department store. Within a department store, employees move from one department to another depending on the requirements of the customers. It is highly desirable to be able to set up a call coverage path that dynamically aligned itself with the wireless terminals present within a given department without involvement of a controlling wireless switching system.

SUMMARY OF THE INVENTION

The foregoing problems are solved, and a technical advance is achieved by an apparatus and method in which wireless terminals automatically and dynamically establish call coverage groups based on physical locations. Each location is assigned a call coverage telephone number. When a new wireless terminal enters the location, the wireless terminals automatically and dynamically determine a new call coverage path. The wireless terminals establish the new call coverage path by communicating with each other. The wireless switching system to which the wireless terminals are connected does not administer the call coverage group. Advantageously, the criteria utilized to establish the call coverage group is stored within the wireless terminals that will be part of that call coverage group. When a call is received by the wireless switching system for the call coverage number, the wireless switching system broadcasts a page message for the call coverage number. The wireless terminals in the call coverage group for the call coverage number each wait an individual predefined amount of time before attempting to respond to the page message. The individual predefined amount of time for each wireless terminal in the call coverage group is defined by the wireless terminal's position in the call coverage path. If available, the first wireless terminal in the call coverage path will immediately respond to the setup message for the call coverage number.

Advantageously, each wireless terminal is defined as having a specific priority in each of the potential call coverage groups for the various locations. One priority is that the wireless terminal will not be part of a particular location's call coverage group—the wireless terminal is excluded from that call coverage group. When two wireless terminals have the same priority for a particular call coverage group, a secondary definition is used to establish the call coverage path. Advantageously, this secondary information will be the assigned dial number of the wireless terminal. With the lowest dial number taking preference in the call coverage path. Advantageously, the priority could be based on the skill, assignment, or other information concerning the user of the wireless terminal for a particular location.

Advantageously, the communication between wireless terminals is controlled by a controlling wireless terminal with which the wireless terminal first communicates upon entering the location. Upon determining that it is leaving the location, the wireless terminal transmits a message to controlling wireless terminal to inform it of this fact. In turn, the controlling wireless terminal transmits messages to the other wireless terminals to inform them of the departure of the wireless terminal.

Other and further aspects of the present invention will become apparent during the course of the following description and by reference to the accompanying drawing

BRIEF DESCRIPTION OF THE DRAWING

FIGS. 2, 3, and 4 illustrate versions of Table 1 that is maintained by each wireless terminal in implementing the invention;

DETAILED DESCRIPTION

Figure 1:
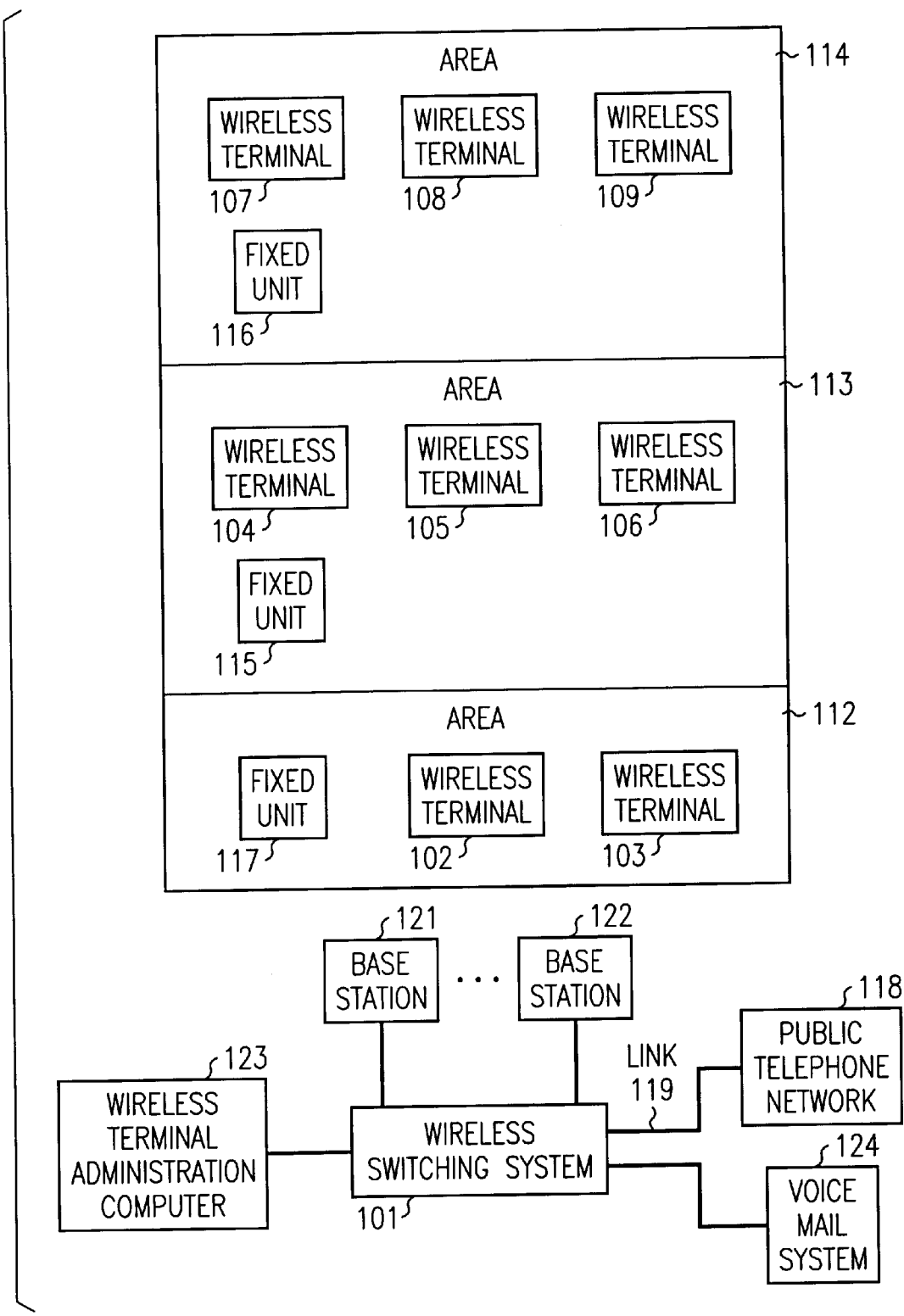
FIG. 1 is a block diagram of a wireless system for implementing the invention.
Figure 5:
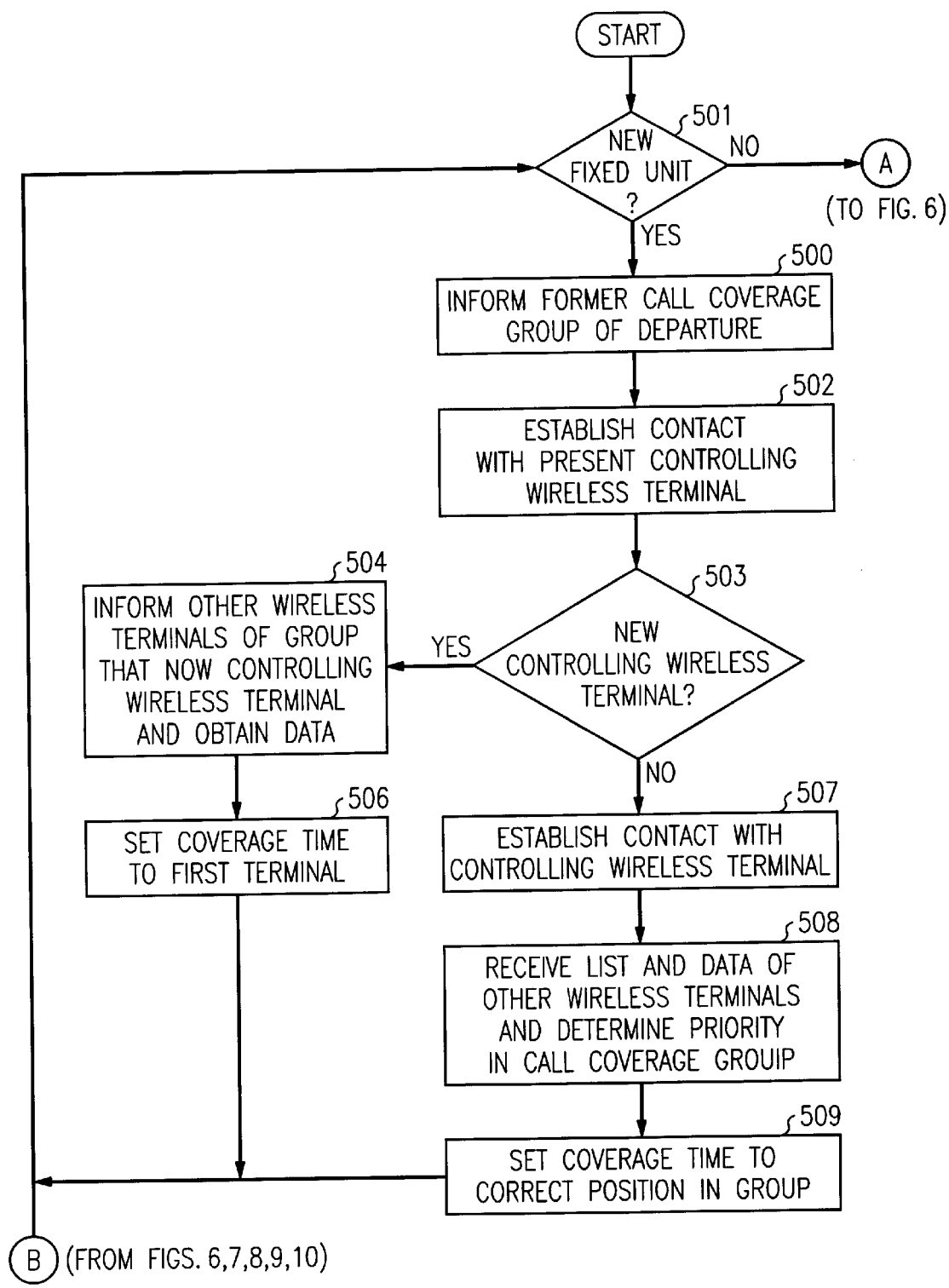
FIGS. 5–10 illustrate, in flow chart form, steps performed by a wireless terminal in implementing the invention.

FIG. 1 illustrates, in block diagram form, a wireless system for implementing the invention. Wireless switching system 101 via base stations 121–122 provides wireless service for wireless terminals 102–109 that are free to roam throughout areas 112–114. Each wireless terminal constantly determines its location with respect to the areas. Advantageously, one method for performing this determination is done in the following manner. At predefined intervals, each fixed unit transmits the identification of the fixed unit via a different transmission medium than utilized by base stations 121–122. This transmission medium may be infrared transmission or other wireless transmission medium. When a wireless terminal receives the identification from a fixed unit, the wireless terminal consults an internal table to determine in what area the fixed unit is. One skilled in the art could readily envision other mechanisms for wireless terminals determining their location. For example, global positioning satellite devices could be utilized, two-way communication between the wireless terminal and the fixed location could be utilized, and position of the base stations could be utilized. Further, the wireless terminals could communicate with wireless switching system 101 and obtain the location information based on the identity of the fixed unit. Wireless terminal administration computer 123 is utilized to administer the data maintained in each wireless terminal as illustrated in FIGS. 2–4. This information can be transferred from wireless administration computer 103 via data links communicated by wireless switching system 101 and base stations 121–122 or by physical connection of the wireless terminals to wireless administration computer 123. To better understand the functioning of the wireless system illustrated in FIG. 1, consider the following first example. As illustrated in Table 1 of FIGS. 2–4, each wireless terminal maintains a table that defines for each area as indicated in Column 201 of FIG. 2, the telephone coverage number for the area as defined in Column 202, the priority that the wireless terminal has in each area as indicated in Column 203, the identification number of the fixed unit for an area as indicated in Column 204, and the individual assigned telephone number for the wireless terminal in each of the areas as indicated in Column 206. FIGS. 3 and 4 are similar but for wireless terminals 103 and 104, respectively.

As illustrated in FIG. 1, within area 112, wireless terminals 102 and 103 have established a call coverage path for the telephone coverage number of 1900 for area 112. The call coverage path has wireless terminal 103 as the first coverage station (since it has a priority number of 2 for area 112 as designated in FIG. 3 in Column 303) and wireless terminal 102 is the second wireless terminal in the call coverage path having a priority number of 1 for area 112 as designated in Column 203 of FIG. 2. Advantageously, the information listed in Table 1 can be entered manually into the wireless terminals, downloaded from wireless terminal administration computer 123 via wireless switching system 101 and base stations 121–122, or each wireless terminal can be physically connected to wireless terminal administration computer 123 or Table 1 can also be dynamically negotiated between wireless terminals 102 and 103.

In the present first example, consider the situation when wireless terminal 104 enters area 112. Wireless terminal 104 has a priority of 3 in area 112 as indicated by Columns 401 and 403 of FIG. 4. As will be described in greater detail later, communications between wireless terminals within a call coverage group is controlled by a controlling wireless terminal. A controlling wireless terminal is the wireless terminal in a particular call coverage group that has the highest priority number (as defined in columns 203, 303, and 403 of Table 1) within the call coverage group. One skilled in the art could readily envision other algorithms that could be utilized for determining the controlling wireless terminal. For example, the criteria could be the wireless terminal that had been present in the call coverage group for the longest period of time, had the highest telephone number, or had the lowest priority in the call coverage group.

When wireless terminal 104 enters area 112, it makes contact with wireless terminal 103 in the following manner. First, wireless terminal 104 transmits a transceiver alert message which defines the telephone number of wireless terminal 104 and is directed to a predefined number reserved for contacting controlling wireless terminal. Advantageously, this predefined number maybe 999. The controlling wireless terminal then properly handles the protocol for the transceiver alert message and then, establishes a data call to wireless terminal 104. Wireless terminal 103 then transmits to wireless terminal 104 the priority number, assigned telephone number, and coverage delay time for wireless terminal 102 and 103. Wireless terminal 104 is responsive to the fact that its priority number, 3, is higher than the priority number of wireless terminal 103 to assume the responsibilities of the controlling wireless terminal for the call coverage group. Consequently, wireless terminal 104 sets its coverage delay to 0 and transmits to wireless terminals 102 and 103 their coverage delay times of 20 and 10, respectively. FIGS. 2–4 are then updated by their respective wireless terminal.

The position in the call coverage path is actually specified by how many seconds a wireless terminal will wait until responding to a setup message intended for the call coverage number. This delay for the present example is specified in Columns 207, 307, and 407 of FIGS. 2, 3, and 4 for wireless terminals 102–104 respectively. Note, that each coverage delay column will only have one entry because a wireless telephone will only be active in one area at a time. As can be seen from Columns 207–407, wireless terminal 104 immediately responds to a page message for coverage number 1900 if wireless terminal 104 is available, wireless terminal 103 waits 10 seconds before responding to such a setup message unless it detects an alerting message being transmitted for coverage number 1900, and wireless terminal 102 waits 20 seconds before responding. The coverage delay for the present example is based on the assigned priority of each wireless terminal as illustrated in FIGS. 2–4.

Consider a second example in which wireless terminal 104 is initially in area 113 with wireless terminals 105 and 106. Assume that wireless terminals 105 and 106 have a priority of 4 and 3, respectively. This means that the call coverage path has wireless terminal 105 first, wireless terminal 106 second, and wireless terminal 104 third since wireless terminal 104 has a priority of 2 in area 113 as illustrated in Column 403 of FIG. 4. Since wireless terminal 105 has the highest priority, wireless terminal 105 is the controlling wireless terminal for the call coverage path established for area 113. Consequently, wireless terminal 105 has obtained the priority number, assigned telephone number, and coverage delay time from wireless terminals 104 and 106. In addition, wireless terminal 105 has transmitted the information to wireless terminals 104 and 106 defining these values. Assume that wireless terminal 102 enters area 113. As before, wireless terminal 102 recognizes that it is now receiving identification information from fixed unit 115 rather than fixed unit 117 and transmits a transceiver alert message. Wireless terminal 103, the controlling wireless terminal for area 113, responds to the transceiver alert message and establishes a data call with wireless terminal 102. Wireless terminal 103 transfers the information concerning wireless terminals 104–106 to wireless terminal 102. During the exchange of information, it is apparent that wireless terminals 105 and 106 will retain their present position in the call coverage path; however, wireless terminals 102 and 104 both have a priority number of 2 in area 113. Advantageously, this is resolved by considering the assigned telephone number for both wireless terminals. Wireless terminal 102 has an assigned number of 4901 as seen from Column 206 and wireless terminal 104 has an assigned number of 4903 as seen from Column 406. Consequently, wireless terminal 102 becomes the third wireless terminal in the call coverage path since it has the lowest assigned number. One skilled in the are could readily envision that the highest assigned telephone number could have priority. In addition, one skilled in the are can readily envision other mechanisms for establishing this secondary preference. One such mechanism would be to give priority to the wireless terminal that was already present in the call coverage group or was not present in the call coverage group. In addition, such factors as length of time in communication with wireless switching system 101, rate of calls received in the last predefined period of time, or warmth of the user's hand on the telephone could all be utilized to make this secondary determination.

Consider the third example where wireless terminal 102 enters area 114. An examination of Column 203 of FIG. 2 for wireless terminal 102 indicates that wireless terminal 102 has a priority of zero in area 114. Consequently, wireless terminal 102 will not attempt to enter a call coverage group in area 114.

Consider the situation after the completion of example 2. Wireless terminal 104 now is in the first position of the call coverage path for area 112. If wireless terminal 104 leaves, the call coverage path must be adjusted so that wireless terminal 103 is now in the first position of the call coverage path. This is accomplished by the utilization of data calls between wireless terminals. However, the departure of wireless terminal 104 must be detected. Advantageously, the departure of a wireless terminal from an area can be detected by the controlling wireless terminal for that area periodically transmitting messages to the other wireless terminals using data calls. However, the principal manner in which the departure of a wireless terminal is detected is as follows. When a wireless terminal has determined that it no longer is in communication with a fixed unit, the wireless terminal sets up a data call to the controlling wireless terminal associated with the fixed unit and informs the controlling wireless terminal that the departing wireless terminal has left the call coverage group. The controlling wireless terminal is responsive to this information to update its own Table 1 and to transmit the information to the other wireless terminals in the call coverage group so that the wireless terminals can update their Table 1. This notification is also automatically done if a user attempts to power off a wireless terminal in a coverage area. As is well known in the art, if a call is not answered by a wireless terminal in the call coverage path, wireless switching system 101 wants to transfer this call to voice mail system 124. As can be seen from Table 1 of FIGS. 2–4, the telephone number of the voice mail system that should be utilized for each coverage area is recorded, for example, in Column 208 of FIG. 2. If the controlling wireless terminal for a call coverage group can not respond to an incoming call, the controlling wireless terminal continues to monitor the incoming call to determine if another wireless terminal has responded to the page message for the incoming call. If no response is received within the amount of time of the longest coverage delay time, the controlling wireless terminal transmits a message to wireless switching system 101 to have the incoming call transferred to voice mail system 124 utilizing the telephone number of voice mail system 124. Alternately, the controlling wireless terminal is immediately responsive to the page message to transmit to wireless switching system 101 the maximum coverage delay time for the call coverage group. If the maximum call coverage delay time is exceeded, wireless switching system 101 immediately transfers the incoming call to voice mail system 124.

Advantageously, in a second embodiment, the transfer to voice mail system 124 is accomplished by each wireless terminal in the call coverage path transmitting to wireless switching system 101 an INFO message in response to the page message defining the coverage delay that each wireless terminal will wait before responding to a page message. When all wireless terminals have had sufficient time to respond to the paging messaging and have not done so, wireless switching system 101 transfers the call to voice mail system 124. Note, if any wireless terminal in the call coverage path has invoked the send all call features, it notifies the controlling wireless terminal of this fact using a data call.

Controlling wireless terminal notifies the other wireless terminals allowing the other wireless terminals of greater coverage delay to decrease this delay FIGS. 5–10 illustrate, in flow chart form, the steps performed by a wireless terminal. After being started, decision block 501 determines if contact has been made with a new fixed unit. If the answer is yes, Block 500 informs the former call coverage group of the departure of the wireless terminal. If the wireless terminal was the controlling wireless terminal in the former call coverage group, the wireless terminal transmits via a data call a message to the wireless terminal having the next highest priority informing that wireless terminal that it is the new controlling wireless terminal. If the departing wireless terminal was not the controlling wireless terminal, it transmits a message via a data call to the controlling wireless terminal informing the controlling wireless terminal of its departure. In either case, the resulting controlling wireless terminal of the former call coverage group then informs the other wireless terminals of the call coverage group of the departure. After execution of Block 500, control is transferred to Block 502. The wireless terminal establishes contacts with the present controlling wireless terminal by transmission of a transceiver alert message in block 502 as illustrated in FIG. 11. The present controlling wireless terminal responds to this message with a disconnect and then transmits a data call to the present wireless terminal. After execution of block 502, control is transferred to decision block 503 which determines if the present wireless terminal is the new controlling wireless terminal. Note, that the response to the transceiver alert message from the present controlling wireless terminal identified the telephone number of the present wireless terminal allowing the present controlling wireless terminal to setup a data call. If no response is received to the transceiver alert message, the present wireless terminal executes block 504. If the present wireless terminal is the new controlling wireless terminal, which means that it is higher in the call coverage priority than the current controlling wireless terminal, control is transferred to block 504 which informs the other wireless terminals in the call coverage group that the present wireless terminal is now the controlling wireless terminal. Then, block 506 sets the coverage time of the present wireless terminal to be the first terminal in the call coverage group before returning control to decision block 501.

If the present wireless terminal is not the new controlling wireless terminal, control is transferred from decision block 503 to block 507 which establishes contact with the controlling wireless terminal. Then, block 508 receives the data of other wireless terminals in the call coverage group and determines the wireless terminal's priority in the call coverage group. Block 509 sets the coverage time for the priority of the present wireless terminal in the call coverage group before returning control to decision block 501.

Figure 6:
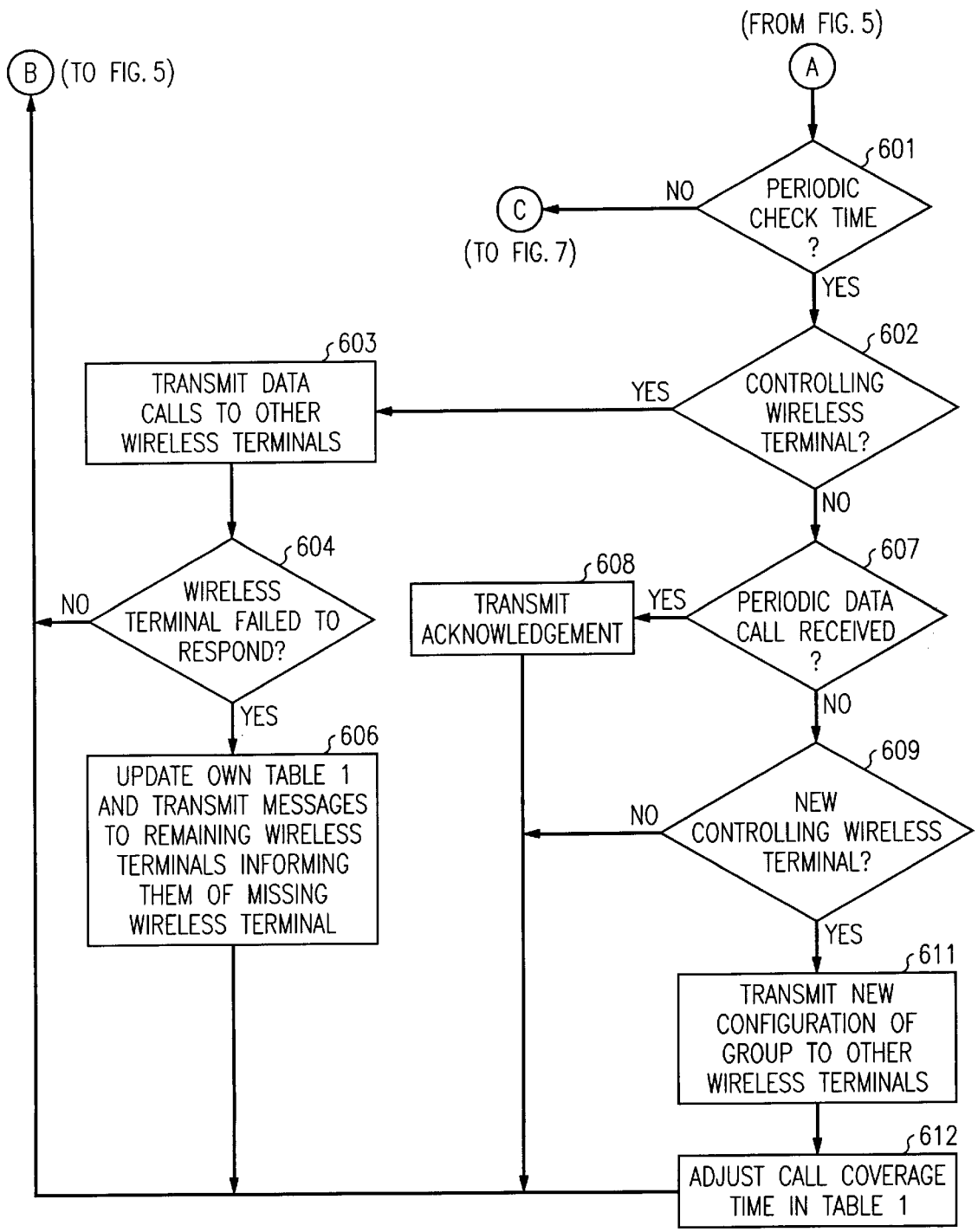

Returning to decision block 501, if communication has not been established with a new fixed unit, control is transferred to decision block 601 of FIG. 6. Decision block 601 determines if the time has expired for the periodic check of the wireless terminals presently in a call coverage group. If the answer is yes, control is transferred to decision block 602 which determines if the present wireless terminal is a controlling wireless terminal in a call coverage group. If the answer is yes in decision block 602, block 603 transmits data calls to each of the other wireless terminals in the call coverage group. Decision block 604 determines if any of these wireless terminals failed to respond to the data call. If the answer is no, control is transferred back to decision block 501 of FIG. 5. If the answer is yes in decision block 604, block 606 updates the Table 1 of the present wireless terminals and transmits messages to the remaining wireless terminals in the call coverage group informing them of the missing wireless terminal before transferring control back to decision block 501 of FIG. 5.

If the answer in decision block 602 is that the present wireless terminal is not the controlling wireless terminal of the call coverage group, control is transferred to decision block 607. The latter decision block determines if a periodic data call has been received. If the answer is yes, block 608 transmits back an acknowledgement message before returning control to decision block 501 of FIG. 5. If the answer in decision block 607 is no which indicates that the controlling wireless terminal has left the call coverage group. Decision block 609 determines if the present wireless terminal is the new controlling wireless terminal. If the answer is no, control is transferred back to decision block 501 of FIG. 5. If the answer is yes, block 611 transmits the new configuration of the call coverage groups to the other wireless terminals in the call coverage group, and block 612 adjusts the call coverage time for the present wireless terminal before transferring control back to decision block 501 of FIG. 5.

Figure 7:
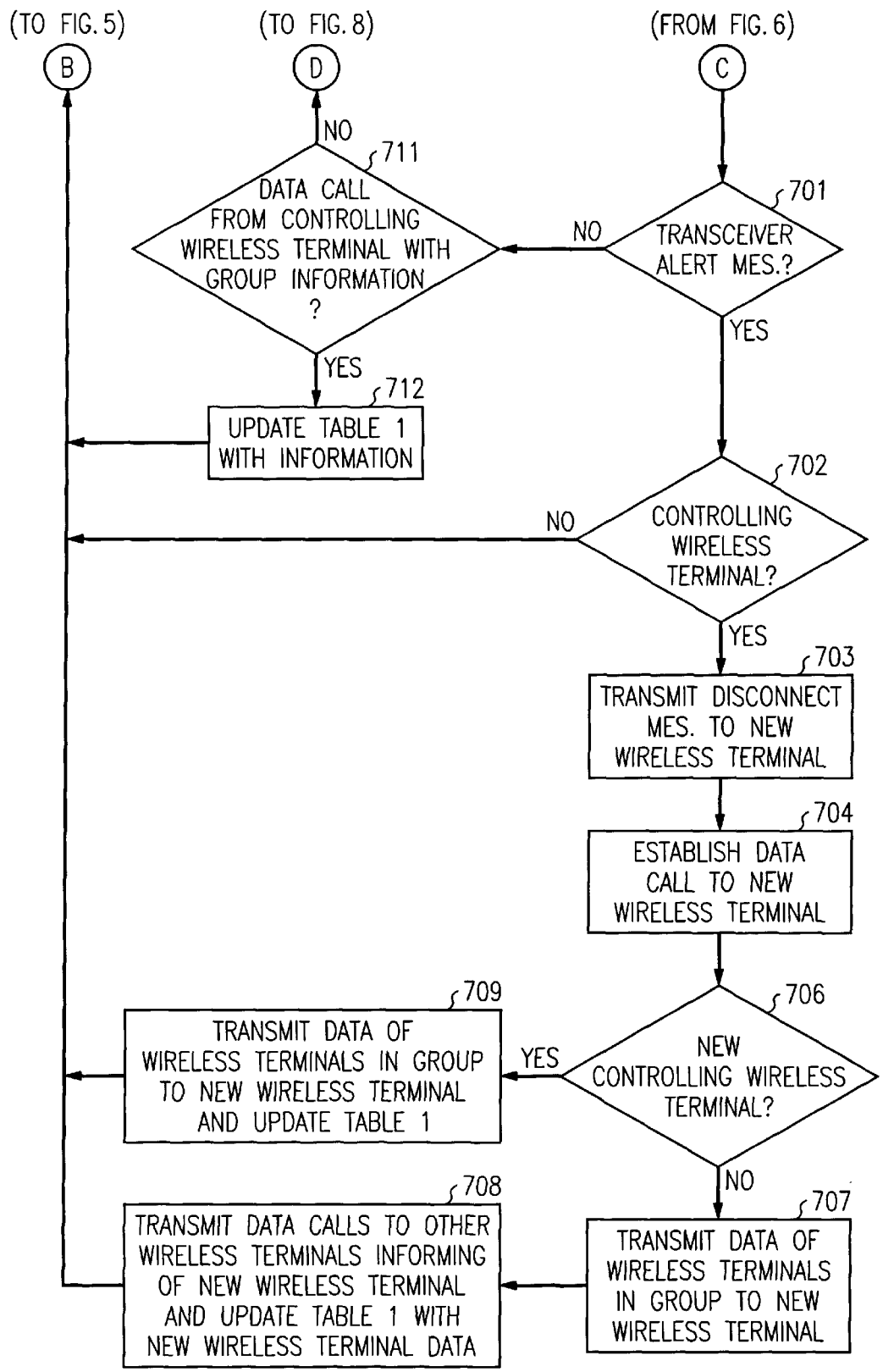

Returning to decision block 601, if the answer is no, control is transferred to decision block 701 of FIG. 7. Decision block 701 determines if a transceiver alert message has been received from another wireless terminal. If the answer is yes, decision block 702 determines if the present wireless terminal is the controlling wireless terminal for the call coverage group. If the answer is no, the present wireless terminal makes no response to the transceiver alert message but transfers control back to decision block 501 of FIG. 5. If the answer is yes in decision block 702, block 703 transmits a disconnect message to the new wireless terminal, and block 704 establishes a data call to the new wireless terminal. Decision block 706 determines if the new wireless terminal is to be the controlling wireless terminal of the call coverage group. If the answer is yes, block 709 transmits the data of the wireless terminals in the call coverage group to the new wireless terminal and updates Table 1 of the present wireless terminal to reflect the new controlling wireless terminal before transferring control back to decision block 501 of FIG. 5. If the answer in decision block 706 is no, block 707 transmits the data of the other wireless terminals in the call coverage group to the new wireless terminal, and block 708 transmits data calls to the other wireless terminals of the call coverage group informing them of the identifications of the new wireless terminals and updates Table 1 of the present wireless terminal with the identification of the new wireless terminal before transferring control back to decision block 501 of FIG. 5.

Returning to decision block 701, if the answer is no, control is transferred to decision block 711. If a data call has been received from the controlling wireless terminal with call coverage group information, the answer is yes in decision block 711. If the answer is yes, block 712 updates Table 1 of the present wireless terminal with the new call coverage group information before returning control back to decision block 501 of FIG. 5. If the answer is no in decision block 711, control is transferred to decision block 801 of FIG. 8.

Decision block 801 determines if a page message has been transmitted by wireless switching system 101 for a group call coverage number. If the answer is yes in decision block 801, decision block 803 determines if the send all call feature is invoked. If the answer is yes, control is transferred to decision block 811 that determines if the wireless terminal is the controlling wireless terminal. If the answer is no, control is transferred back to decision block 501 of FIG. 5. If the answer in decision block 811 is yes, decision block 812 determines if the page is responded to before the maximum call coverage time for all of the wireless terminals in the call coverage group. If the answer is yes, control is transferred back to decision block 501 of FIG. 5. If the answer is no in decision block 812, block 813 transmits a message to wireless switching system 101 to transfer the incoming call to voice mail system 124.

Returning to decision block 803, if the answer is no, control is transferred to block 804. Block 804 waits the amount of time specified by the coverage delay time for the call coverage group. Then block 805 responds to the page and indicates the page that is being responded to. Block 806 then performs normal processing before returning control back to decision block 501 of FIG. 5.

In the second embodiment in which the wireless terminals utilize INFO messages to inform wireless switching system 101 of their call coverage delay time, Block 804 would immediately transmit to wireless switching system 101 its call coverage delay time. In addition, in that second embodiment, blocks 811–813 would not be present. A yes response in decision block 803 would result in control being immediately transferred to decision block 501 of FIG. 5.

If the answer in decision block 801 is no, decision block 802 determines if communication has been lost with the fixed unit. If the answer is yes, control is transferred to decision block 807. The latter decision block determines if the present wireless terminal is the controlling wireless terminal for the call coverage group. If the answer is no, control is transferred to block 809 which transmits a message to the controlling wireless terminal for the call coverage group informing it that the present wireless terminal has left the call coverage group. If the answer is yes in decision block 807, block 808 transmits a message to the next highest priority wireless terminal in the call coverage group informing that wireless terminal that it is the new controlling wireless terminal. After execution of either block 808 or 809, control is transferred back to decision block 501 of FIG. 5.

Figure 8:
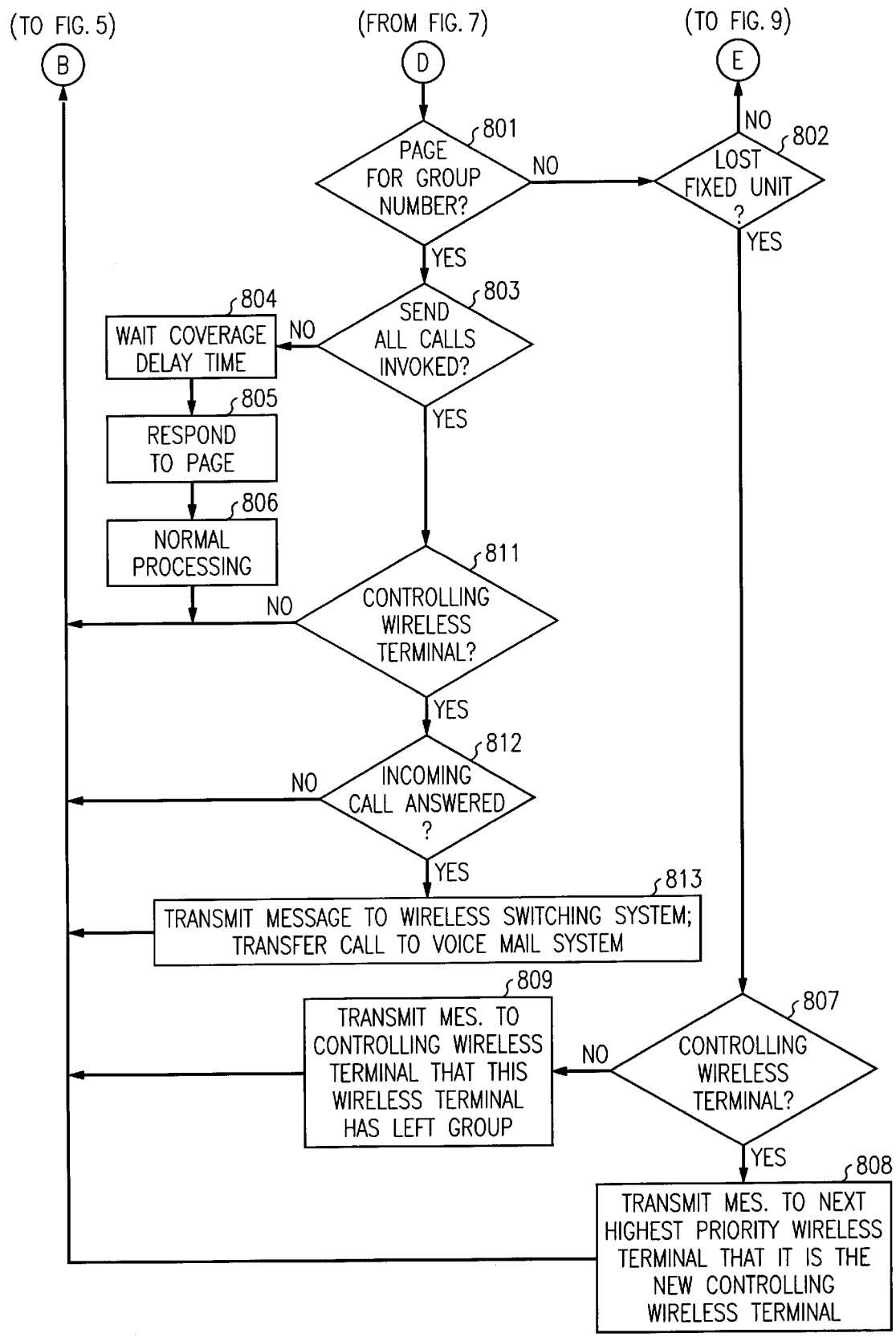
Figure 9:
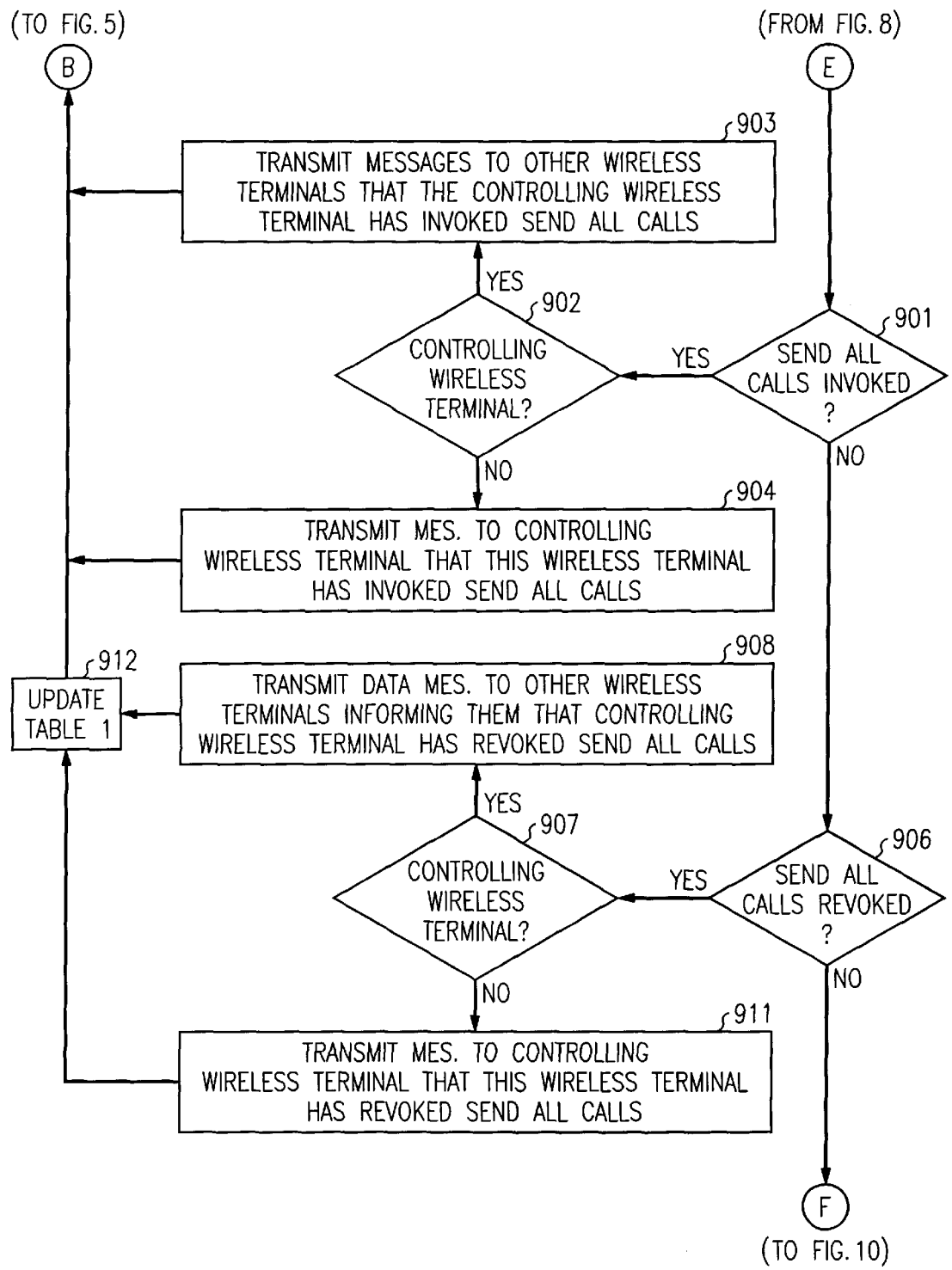

Returning to decision block 802 of FIG. 8, if the answer is no that communication has not been lost with a fixed unit, control is transferred to decision block 901 of FIG. 9. The latter decision block determines if the send all calls feature has been invoked. If the answer is yes, decision block 902 determines if the wireless terminal is the controlling wireless terminal. If the answer is yes, block 903 transmits messages to the other wireless terminals in the call coverage group informing those terminals that the controlling wireless has invoked the send all call feature before transferring control back to decision block 501 of FIG. 5. If the answer in decision block 902 is no, block 904 transmits a message to the controlling wireless terminal that the present wireless terminal has invoked the send all calls feature before returning control back to decision block 501 of FIG. 5.

Returning to decision block 901, if the send all calls feature has not been invoked, decision block 906 determines if the send all calls feature has been revoked. If the answer is yes, decision block 907 determines if the present wireless terminal is the controlling wireless terminal. If the answer is yes, block 908 transmits data messages to the other wireless terminal informing them that the controlling wireless terminal has revoked the send all calls feature. After execution of block 908, block 912 updates Table 1 before transferring control back to decision block 501 of FIG. 5. If the answer is no in decision block 907, block 911 transmits a message to the controlling wireless terminal informing that wireless terminal that the present wireless terminal has revoked the send all calls feature before transferring control to block 912.

Figure 10:
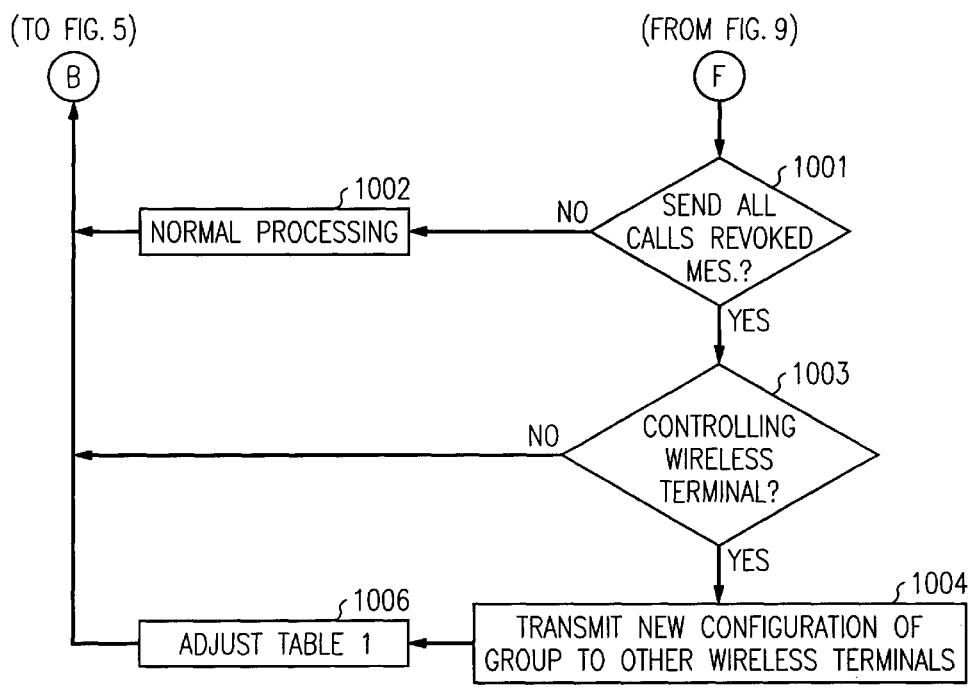
Figure 11:
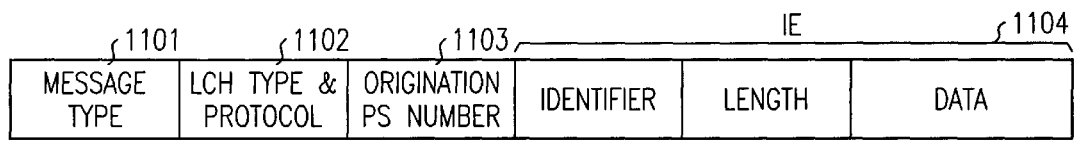
FIG. 11 illustrates the format of a transciever alert message.

Returning to decision block 906, if the answer is no, control is transferred to decision block 1001 of FIG. 10. The latter decision block determines if a send all calls revoked message such as would have been sent by block 911 of FIG. 9 has been received. If the answer is no, block 1002 performs normal call processing before returning control to decision block 501 of FIG. 5. If the answer is yes in decision block 1001, decision block 1003 determines if the wireless terminal is the controlling wireless terminal for the call coverage group. If the answer is no, control is transferred back to decision block 501 of FIG. 5. If the answer is yes, control is transferred to Block 1004 so that the other wireless terminals can be informed. Block 1004 transmits the new configuration of the call coverage group to the other wireless terminals in the call coverage group, and Block 1006 makes the necessary changes in Table 1 before returning control to decision block 501 of FIG. 5.

Figure 12:
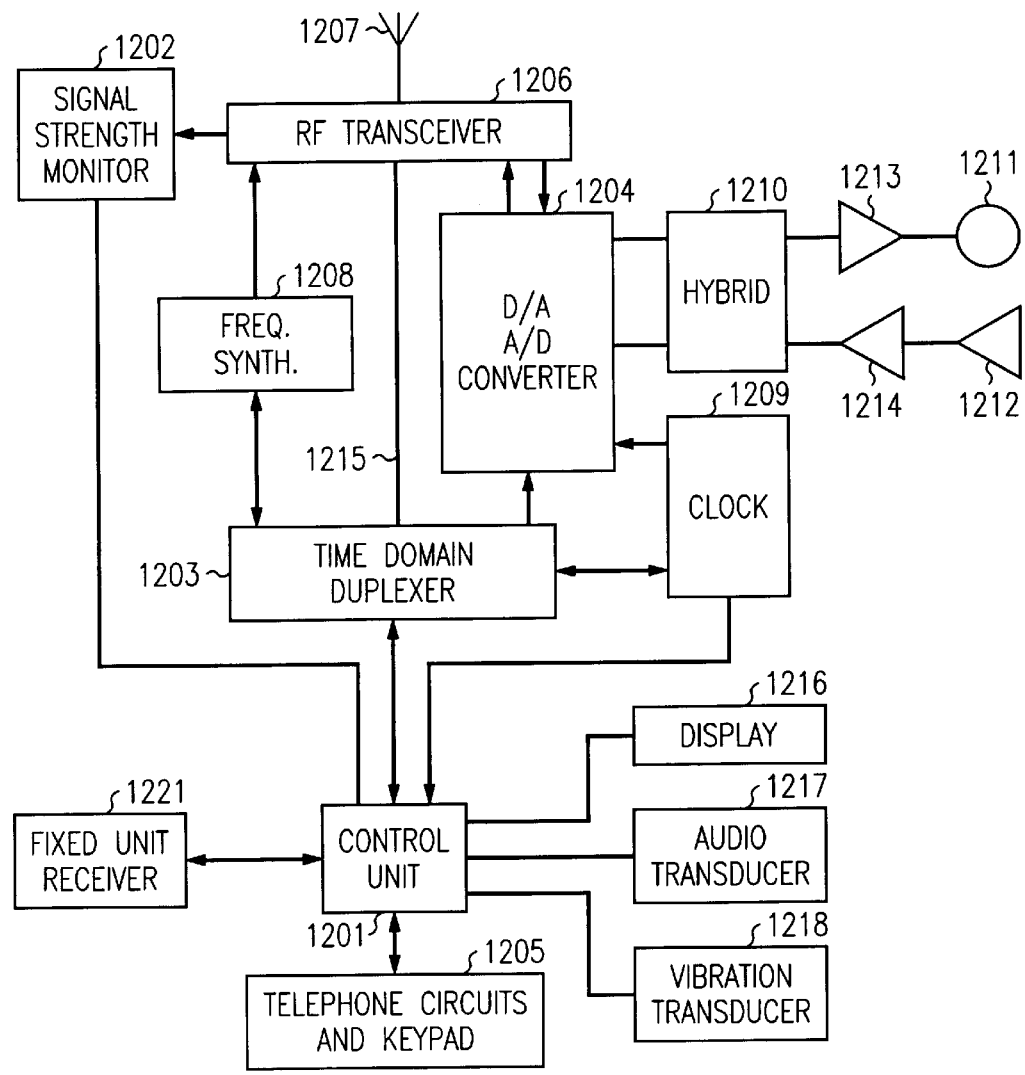
FIG. 12 illustrates, in block diagram form, a wireless terminal.

Wireless terminal 102 is illustrated in greater detail in FIG. 12. Wireless terminal 102 implements a wireless protocol that allows wireless terminal 102 to maintain a wireless signal link with wireless switching system 101 via base stations 121–122. One air interface that can be used is the Japanese PHS protocol as set forth in "User-Network Interface and Inter-Network Interface Standards for PHS", the Telecommunication Technology Committee, 1995, and "Personal Handy Phone System RCR Standard", Version 1, RCR STD-28, Dec. 20, 1993. The message set of the PHS protocol is similar to the ISDN message set. Overall control of the wireless terminal is provided by control unit 1201. Units 1202, 1203, 1206,1207, 1208, and 1209 provide the RF communication capabilities for the wireless terminal. Elements 1204, 1210, and 1211–1214 provide the audio information received and transmitted to the user; whereas, elements 1216–1218 and 1205 provide the basic user interface. The PHS protocol allows control unit 1201 to establish a logical data channel with wireless switching system 101. Control unit 1201 utilizes this logical data channel to transmit identification information for fixed units to wireless switching system 101. Fixed unit receiver 1221 receives the identification code of a fixed unit and transfers this identification code to control unit 1201 for transmission to wireless switching system 101. Fixed unit receiver 1221 is of a design well known in the art for either infrared or ultrasonic transmission media. One skilled in the art could readily see that fixed unit receiver 1221 could provide to control unit 1201 the signal strength of the received signal. Further, control unit 1201 could also tune fixed unit receiver 1221 to receive different frequencies or other variations of the transmission media using well known techniques in the art.

Figure 13:
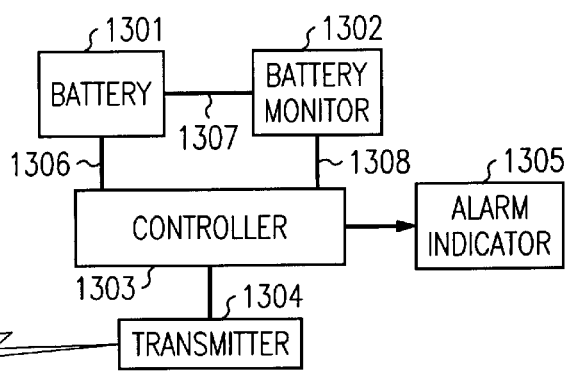
FIG. 13 illustrates, in block diagram form, a fixed unit.

FIG. 13 illustrates in block diagram form a fixed unit. The fixed unit of FIG. 13 is powered by battery 1301. However, one skilled in the art could readily see that normal building AC power could also be utilized to power the fixed unit. Controller 1303 periodically transmits the identification code for the fixed unit via transmitter 1304. Advantageously, transmitter 1304 can be transmitting utilizing infrared transmission or ultrasonic transmission. Transmitters for transmitting either infrared or ultrasonic are well known in the art. If controller 1303 detects that battery 1301 is at a low power level via conductor 1307, battery monitor 1302, and conductor 1308, controller 1303 sets alarm indicator 1305 and transmits the low power indication along with the identification code via transmitter 1304.

Figure 14:
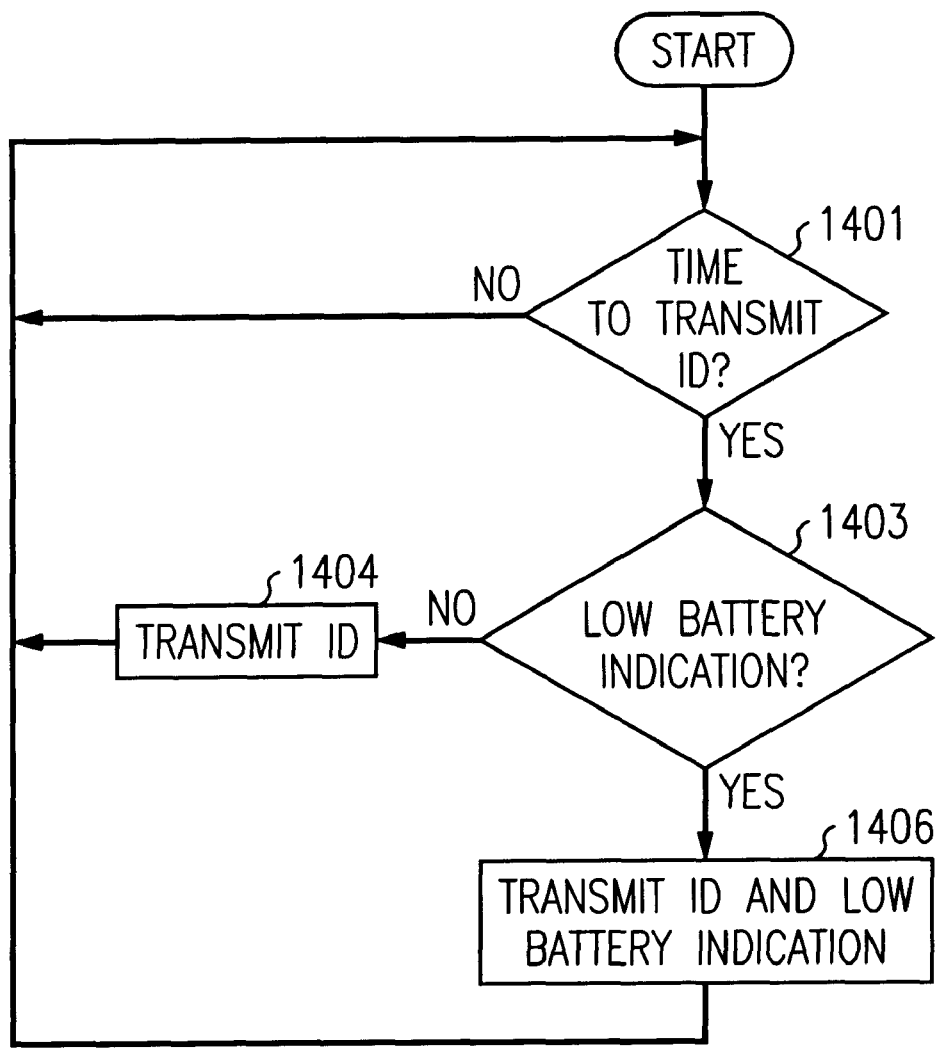
FIG. 14 illustrates, in flow chart form, steps performed by a fixed unit.

FIG. 14 illustrates the steps performed by a fixed unit. Decision block 1401 determines if it is time to transmit the identification code of the fixed unit. Advantageously, the identification code is transmitted every tenth of a second. If the answer is no, control is transferred back to decision block 1401. If the answer is yes, decision block 1403 determines if battery monitor 1302 of FIG. 13 is indicating a low battery. If the answer is no, block 1404 simply transmits the identification code of the fixed unit before transferring control back to decision block 1401. If the answer in decision block 1403 is yes, block 1406 transmits a message that includes the identification code and a low battery indication before transferring control back to decision block 1401.

Of course, various changes in modification to the illustrated embodiment described above will be apparent to those skilled in the art. These changes and modifications can be made without departing from the spirit and scope of the invention and without diminishing its intended advantages. It is therefore intended that such changes and modifications be covered by the following claims.

What is claimed is:

1. A method for establishing call coverage groups, comprising the steps of:

determining a one of a plurality of locations of one of a plurality of wireless terminals;

establishing communication with other ones of the plurality of wireless terminal in the one of the plurality of locations that are in a call coverage group for the one of the plurality of locations; and entering into the call coverage group for the one of the plurality of locations by the one of the plurality of wireless terminals in response to the communication with the other ones of the plurality of wireless terminals.

2. The method of claim 1 wherein the step of entering comprises the step of arranging a position in the call coverage group for the one of the plurality of wireless terminals by other ones of the plurality of wireless terminals and the one of the plurality of wireless terminals.

3. The method of claim 2 wherein inter-wireless terminal communication for each of the call coverage groups is controlled by a controlling one of the plurality of wireless terminals each controlling one of the plurality call coverage group.

4. The method of claim 3 wherein the step of establishing comprises the step of contacting a controlling one of the plurality of wireless terminals by the one of the plurality of wireless terminals.

5. The method of claim 4 wherein the step of contacting comprises the step of transmitting a wireless terminal-to-wireless terminal message to the controlling one of the plurality of wireless terminals of the call coverage group by the one of the plurality of wireless terminals.

6. The method of claim 5 wherein wireless terminal-to-wireless terminal message includes an identification of the one of the plurality of wireless terminals and the one of the plurality of locations.

7. The method of claim 5 wherein the step of contacting comprises the step of determining whether the one of the plurality of wireless terminal should replace the controlling one of the plurality of wireless terminals as a new controlling one of the plurality of wireless terminals.

8. The method of claim 7 wherein the controlling one of the plurality of wireless terminals for call coverage group is determined by a predefined algorithm.

9. The method of claim 3 further comprises the steps of leaving the one of the plurality of locations by the one of the plurality of wireless terminals; and transmitting in response to the leaving the one of the plurality of locations a message to the controlling one of the plurality of wireless terminals to inform the controlling one of the plurality of wireless terminals that the one of the plurality of wireless terminals is no longer in the call coverage group.

10. The method of claim 9 further comprises the step of transmitting another message by the controlling one of the plurality of wireless terminals to each of the other ones of the plurality of wireless terminals that are in the call coverage group to inform the other ones of the plurality of wireless terminals that the one of the plurality of wireless terminals is no longer in the call coverage group.

11. The method of claim 3 further comprises the steps of detecting an actuation of a send all calls feature on the one of the plurality of wireless terminals; and transmitting a first message to controlling one of the plurality of wireless terminals by the one of the plurality of wireless terminals to inform the controlling one of the plurality of wireless terminals that the one of the plurality of wireless terminals has activated the send all calls feature.

12. The method of claim 11 further comprises the step of transmitting a second message by the controlling one of the plurality of wireless terminals in response to the message to each of the other ones of the plurality of wireless terminals in the call coverage group to inform them that the one of the plurality of wireless terminals has activated the send all calls feature.

13. The method of claim 12 further comprises the step of each of the other ones of the plurality of wireless terminals rearranging the position of each in the call coverage group in response to the second message.

14. The method of claim 13 further comprises the steps of detecting an deactivation of the send all calls feature on the one of the plurality of wireless terminals; and transmitting a third message to controlling one of the plurality of wireless terminals by the one of the plurality of wireless terminals to inform the controlling one of the plurality of wireless terminals that the one of the plurality of wireless terminals has deactivated the send all calls feature.

15. The method of claim 14 further comprises the step of transmitting a fourth message by the controlling one of the plurality of wireless terminals in response to the message to each of the other ones of the plurality of wireless terminals in the call coverage group to inform them that the one of the plurality of wireless terminals has deactivated the send all calls feature.

16. The method of claim 15 further comprises the step of each of the other ones of the plurality of wireless terminals rearranging the position of each in the call coverage group in response to fourth message.

17. The method of claim 3 further comprises the step of transmitting a periodic message by the controlling one of the plurality of wireless terminals to each one of the plurality of wireless terminal of the call coverage group to determine a presence of each one of the plurality of wireless terminals in the call coverage group.

18. The method of claim 17 further comprises the steps of determining an absence of the one of the plurality of wireless terminals from the call coverage group by the controlling one of the plurality of wireless terminals; and transmitting a message by the controlling one of the plurality of wireless terminals to each of the other ones of the plurality of wireless terminals that are in the call coverage group to inform the other ones of the plurality of wireless terminals that the one of the plurality of wireless terminals is no longer in the call coverage group.

19. The method of claim 3 wherein the step of determining comprises the steps of communicating with one of a plurality of fixed units; and receiving the identity of the one of the plurality of fixed units.

20. The method of claim 2 further comprises the steps of defining each of the plurality of locations by an individual one of the plurality of fixed units located in each of the plurality of locations; and storing priority numbers in each of the plurality of wireless terminals for each of the plurality of fixed units defining a relative position of each of the one of the plurality of wireless terminals in each call coverage group for each of the plurality of locations.

21. The method of claim 20 wherein the step of arranging comprises the steps of receiving the priority numbers of the other ones of the plurality of wireless terminals in the call coverage group for the one of the plurality of locations by the one of the plurality of wireless terminals; and evaluating the received priority numbers by the one of the plurality of wireless terminals to determine the position of the one of the plurality of wireless terminals in the call coverage group for the one of plurality of locations.

22. The method of claim 21 wherein the step of establishing comprises the step of contacting a controlling one of the plurality of wireless terminals by the one of the plurality of wireless terminals; and the step of receiving comprises the step of transmitting the priority numbers of the other ones of the plurality of wireless terminals in the call coverage group for the one of the plurality of locations to the one of the plurality of wireless terminals.

23. The method of claim 22 wherein the step of contacting comprises the step of transmitting a wireless terminal-to-wireless terminal message to the controlling one of the plurality of wireless terminals of the call coverage group by the one of the plurality of wireless terminals.

24. The method of claim 23 wherein wireless terminal-to-wireless terminal message includes an identification of the one of the plurality of wireless terminals and the one of the plurality of locations.

25. The method of claim 23 wherein the step of contacting comprises the step of determining whether the one of the plurality of wireless terminal should replace the controlling one of the plurality of wireless terminals as a new controlling one of the plurality of wireless terminals.

26. The method of claim 25 wherein the controlling one of the plurality of wireless terminals for each of the plurality of call coverage groups is determined by a predefined algorithm.

27. The method of claim 23 further comprises the steps of leaving the one of the plurality of locations by the one of the plurality of wireless terminals; and transmitting in response to the leaving the one of the plurality of locations a message to the controlling one of the plurality of wireless terminals to inform the controlling one of the plurality of wireless terminals that the one of the plurality of wireless terminals is no longer in the call coverage group.

28. The method of claim 27 further comprises the step of transmitting another message by the controlling one of the plurality of wireless terminals to each of the other ones of the plurality of wireless terminals that are in the call coverage group to inform the other ones of the plurality of wireless terminals that the one of the plurality of wireless terminals is no longer in the call coverage group.

29. The method of claim 23 further comprises the step of transmitting a periodic message by the controlling one of the plurality of wireless terminals to each one of the plurality of wireless terminal of the call coverage group to determine a presence of each one of the plurality of wireless terminals in the call coverage group.

30. The method of claim 29 further comprises the steps of determining an absence of the one of the plurality of wireless terminals from the call coverage group; and transmitting a message by the controlling one of the plurality of wireless terminals to each of the other ones of the plurality of wireless terminals that are in the call coverage group to inform the other ones of the plurality of wireless terminals that the one of the plurality of wireless terminals is no longer in the call coverage group.

* * * * *